United States Patent [19]
Feuerecker

[11] Patent Number: 6,101,830
[45] Date of Patent: Aug. 15, 2000

[54] COLD STORAGE DEVICE, IN PARTICULAR FOR AN AUTOMOBILE

[75] Inventor: Günther Feuerecker, Stuttgart, Germany

[73] Assignee: Behr GmbH & Co.,, Stuttgart, Germany

[21] Appl. No.: 09/205,105

[22] Filed: Dec. 3, 1998

[30]  Foreign Application Priority Data

Dec. 3, 1997 [DE] Germany .................. 197 53 601

[51] Int. Cl.⁷ .................................................... F28D 5/00
[52] U.S. Cl. ................................ 62/304; 62/244; 62/524
[58] Field of Search ............................... 62/244, 524, 304

[56]  References Cited

U.S. PATENT DOCUMENTS

| | | | |
|---|---|---|---|
| 4,617,332 | 10/1986 | Salyer et al. | 524/4 |
| 4,637,222 | 1/1987 | Fujiwara et al. | 62/244 |
| 4,748,823 | 6/1988 | Asano et al. | 62/524 |
| 4,821,529 | 4/1989 | Maier | 672/244 |
| 4,936,103 | 6/1990 | Newman | 62/244 |
| 5,203,833 | 4/1993 | Howell | 62/244 |
| 5,701,754 | 12/1997 | Choi et al. | 62/244 |
| 5,819,541 | 10/1998 | Tunkel et al. | 62/244 |
| 5,927,091 | 7/1999 | Hong | 62/244 |
| 5,950,436 | 9/1999 | Tunkel et al. | 62/244 |

FOREIGN PATENT DOCUMENTS

| | | |
|---|---|---|
| 0277847B1 | 10/1988 | European Pat. Off. . |
| 2719599A1 | 11/1995 | France . |
| 3815730A1 | 11/1988 | Germany . |
| 4100819C2 | 7/1992 | Germany . |
| 4327866C1 | 9/1994 | Germany . |
| 19530609C2 | 2/1997 | Germany . |
| 08012965A | 1/1996 | Japan . |
| 08012966A | 1/1996 | Japan . |
| 08269440A | 10/1996 | Japan . |
| 10017858A | 1/1998 | Japan . |
| WO 97/41814 | 11/1997 | WIPO . |

*Primary Examiner*—Henry Bennett
*Assistant Examiner*—Mark Shulman
*Attorney, Agent, or Firm*—Foley & Lardner

[57]  ABSTRACT

The invention relates to a cold storage device, in particular for an automobile, having a storage medium for storing cold and a storage medium carrier that is connected in a thermally conductive manner to pipes for carrying a heat transfer medium for charging or discharging the cold storage device. To provide an improved cold storage device particularly suitable for use in an automobile, that is able to accommodate changes in volume of the storage medium while itself having a small structural volume and which can be produced cost-effectively, the storage medium carrier comprises an absorbent material, and the storage medium, in its liquid state, is preferably completely absorbed by the storage medium carrier.

20 Claims, 2 Drawing Sheets

COLD STORAGE DEVICE, IN PARTICULAR FOR AN AUTOMOBILE

BACKGROUND OF THE INVENTION

1. Field of the Invention

The invention relates to a cold storage device, particularly, for use with an automobile air conditioning system, whereby the temperature of a vehicle interior can be cooled more quickly.

2. Description of Related Art

Despite high-performance air-conditioning systems, the air conditioning of automobiles still lacks a certain level of comfort, because at high external temperatures and/or in strong sunshine the vehicle interior is often at a high temperature when the occupant first enters the vehicle. Therefore, a certain period of time is required after starting the vehicle before a pleasant temperature is reached in the vehicle interior. In order to reduce this cooling time and to cool the vehicle interior more quickly, cold storage devices, which are able to release very high cooling capacities within a short time, are utilized.

There are essentially three core problems that have to be solved when designing cold storage devices. It is necessary to provide a good level of heat transfer from a storage medium to a heat transfer medium, to design an effective cold storage device under extreme space constraints due to the compactness of vehicles, and to avoid bursting problems.

The storage medium, which is typically water, should be supercooled only slightly before it starts freezing. Moreover, it is necessary to accommodate expanding volumes due to an expansion of the storage medium when the temperature changes. More particularly, the change in volume caused by phase change is of central importance, because a volume expansion can quickly cause the accumulator to be damaged or possibly destroyed. For example, water expands when it is frozen, therefore, when it is used as the storage medium there is a heightened risk of damage due to water's changing volume.

Cold storage devices are already being used in stationary air-conditioning technology. In this sector, the risk of the storage device bursting due to volume expansion caused by the storage medium freezing is countered by using containers with a suitably large volume which are only partially filled with the storage medium. Such designs cannot be employed in automotive engineering, because of a lack of sufficient space in vehicles and the associated demand for compact designs, and because of the extreme climatic conditions to which a vehicle may be exposed and which the accumulator has to withstand.

SUMMARY OF THE INVENTION

One object of the present invention is to provide an improved cold storage device.

It is also an object of the invention to provide an improved cold storage device that accommodates changes in volume while maintaining a small structural volume.

A further object of the invention is to provide a cold storage device with the above characteristics designed particularly for use in an automobile.

Yet a further object of the invention resides in providing a cold storage device that can be produced cost-effectively.

A still further object of the invention resides in the provision of an automobile containing an air conditioning system that embodies the cold storage device according to the invention.

In accomplishing these and other objects, there has been provided according to one aspect of the invention, a cold storage device comprising a storage medium for accumulating cold and a storage medium carrier connected in a thermally conductive manner to at least one pipe, said at least one pipe being adapted to carry a heat transfer medium for charging or discharging the cold storage device, wherein said storage medium carrier comprises an absorbent material, and wherein said storage medium, in its liquid state, is essentially completely absorbed by the storage medium carrier.

Other objects, features and advantages of the invention will be apparent to those skilled in the art from the detailed description of preferred embodiments that follows, when considered with the accompanying figures of drawing.

BRIEF DESCRIPTION OF THE DRAWINGS

The invention is explained in detail below on the basis of exemplary embodiments with reference to the drawings, in which like numerals represent like parts.

DESCRIPTION OF PREFERRED EMBODIMENTS

Figure 1:
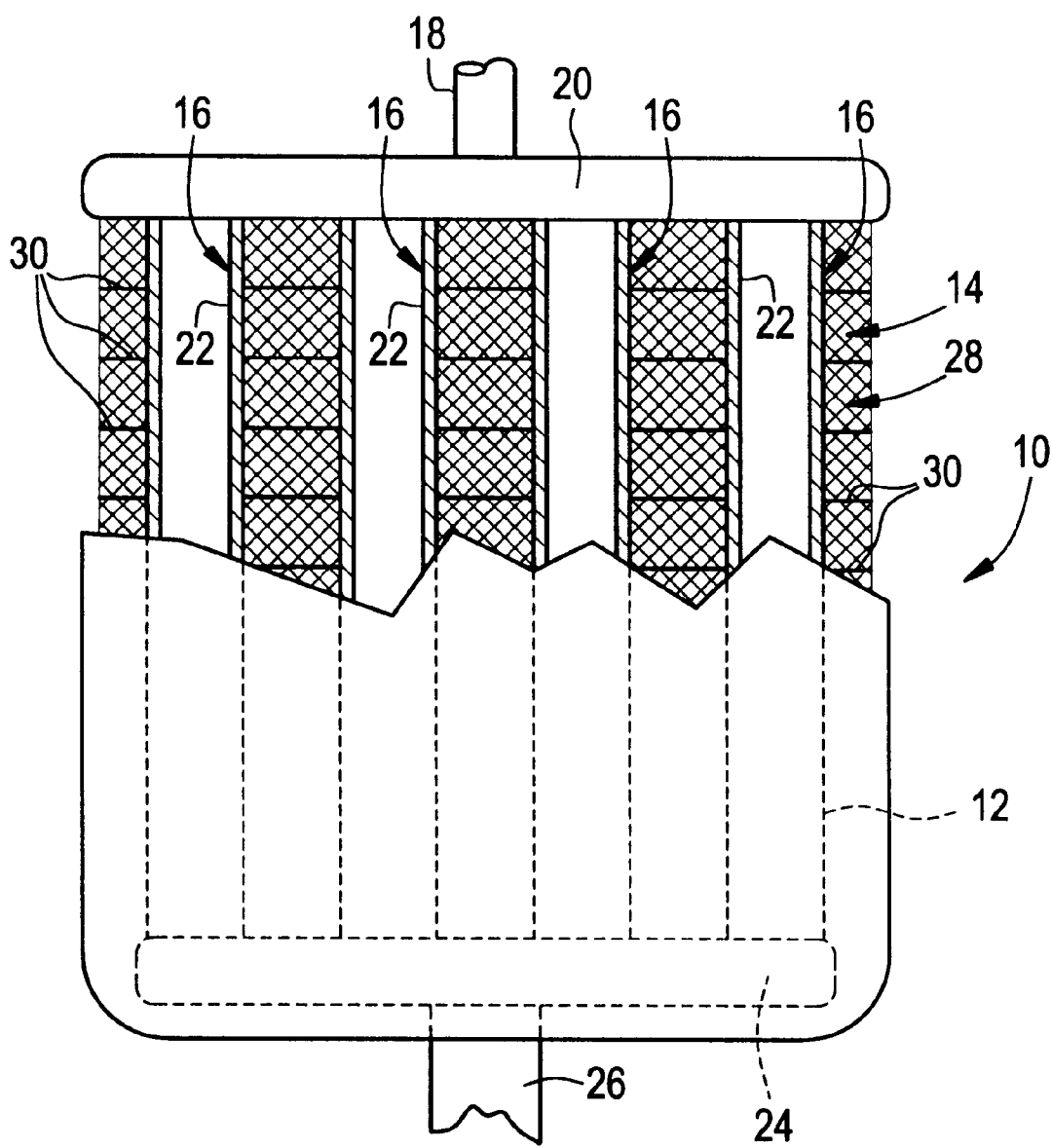
FIG. 1 is a partially broken-away view showing a first embodiment of a cold storage device according to the invention.

According to the invention, the storage medium is held by a storage medium carrier comprising an absorbent material. Furthermore, the storage medium, in its liquid state, is completely absorbed by the storage medium carrier. The absorbent material makes it possible to compensate sufficiently for changes in volume without damaging the cold storage device. The absorbent material may be any of a wide variety of substances that absorb the storage medium, for example, an absorbent material that is capable of taking up between about 30% by volume and about 90% by volume of the storage medium. The absorbent material may employ any means or any desired type of interaction, for example, hydrophilic, capillary or colloidal. A residual volume of the absorbent material, which is able to compensate for the changes in volume of the absorbed storage medium, always remains.

The result is a cold storage device that may have a small structural volume, because the storage medium carrier itself is able to accommodate volume changes. Furthermore, the cold storage device according to the invention can be produced very cost-effectively. The storage medium is absorbed by the storage medium carrier and, therefore, the storage medium is prevented from "sloshing about" in the housing of the cold storage device and an associated "sloshing noise," which is found to be intrusive, is avoided.

A further advantage is that the cold storage device according to the invention can be designed in the manner of known heat exchangers that have proven successful in use. The material of the storage medium carrier simply can be added in later, for example between tubes of the heat exchanger. Thus, it is possible to use known, tried-and-tested, optimized processes for producing heat exchangers and known heat exchanger designs. It is possible, for example, to use round tube or flat tube heat exchanger designs, which have been utilized in automotive construction for long periods of time.

The storage medium is preferably water, and the storage medium carrier preferably comprises a woven fabric, a knitted fabric or a non-woven. Such structures, in particular non-wovens, have long been used, for example in sanitary products, such as disposal diapers or incontinence products. They are extremely inexpensive and have a high liquid absorption capacity, allowing these substances to compensate for changes in storage medium volume to a sufficient extent even when they are loaded with storage medium to the maximum extent.

The melting point of water is 0° C. Higher melting temperatures may be advantageous with a view to obtaining an optimum charging and discharging strategy for the accumulator according to the invention. In that case, it is possible to use as the storage medium, by way of example, hydrates of salts, acids or lyes, aqueous solutions of salt mixtures or clathrates which have appropriate melting points.

In order to increase the absorption capacity, the storage medium carrier is formed from a fiber material, for example, from cellulose fibers. The storage medium may then be absorbed by capillary action in the spaces between the fibers and, if the fibers have hydrophilic properties, even by the fibers themselves.

Particularly, the storage medium carrier preferably contains highly absorbent materials, such as hydrogels, colloids or so-called superabsorbent polymers or the like. Such materials, for example a water-swellable polymer, as is known from DE 4,116,428, are already used in sanitary items. They increase the absorption capacity of the storage medium by a multiple. These materials are also harmless from an environmental standpoint.

If the storage medium carrier is designed as a powder or a pourable substance, there are advantages for the manufacturing process, because, first of all, the heat exchanger structure, i.e., the tubes and ribs, can be manufactured in a known, tried-and-tested way, and then the heat exchanger structure can be filled with the storage medium carrier. As a result, producing the accumulator according to the invention does not require a completely new manufacturing process, but rather merely entails an additional manufacturing step.

Ribs, or fins, comprising a good thermally conductive material are provided to improve the thermal conductivity. The ribs may be constructed, for example, of aluminum.

Preferably, the ribs or fins and the storage medium carrier form a layered structure that is connected to the pipes. This ensures optimum heat transfer between the storage medium contained in the storage medium carrier and the heat transfer medium flowing inside the pipes.

As shown in FIG. 1, a cold storage device 10 preferably has a housing 12. The housing walls are thermally insulated, so that a cooled storage medium, which is situated inside the housing 12, is heated only to a minimal extent by external influences. The cold storage device 10 further comprises a storage medium carrier 14 connected in a thermally conductive manner to pipes 16. The pipes 16 carry a heat transfer medium that exchanges heat with the storage medium to charge and discharge the cold storage device 10, as explained below.

In a first exemplary embodiment illustrated in FIG. 1, the cold storage device 10 is designed in the manner of a round-tube heat exchanger. The heat transfer medium flows from an inlet 18 and a manifold 20 through the pipes 16, which are designed as round tubes 22, to a collection tube 24 and to an outlet 26. The storage medium carrier 14, which comprises an absorbent material and into which the storage medium, preferably water, is completely absorbed, is situated between the round tubes 22.

The storage medium carrier 14 preferably comprises a woven fabric, a knitted fabric or a non-woven fabric. A non-woven fabric 28 made from cellulose fibers is particularly preferred. To increase the storage-medium absorption capacity, highly absorbent materials, such as hydrogels or the like, are incorporated in the non-woven fabric 28. Such materials are also known as superabsorbents in the field of sanitary products, in which they have been used for a long time.

Ribs or fins 30, constructed from materials with good thermal conductivity, are provided to keep the non-woven fabric 28 stable between the round tubes 22 and to increase the thermal connection between the non-woven fabric 28, which contains the storage medium, and the round tubes 22. The ribs or fins 30, for example, may be constructed from aluminum. The ribs or fins 30 are essentially designed as plates that are arranged perpendicular to the round tubes 22 and are soldered to the latter. One layer of the non-woven fabric 28 is situated between an adjacent set of two plates, so that the ribs or fins 30 and the storage medium carrier 14 form a layered structure.

Figure 2:
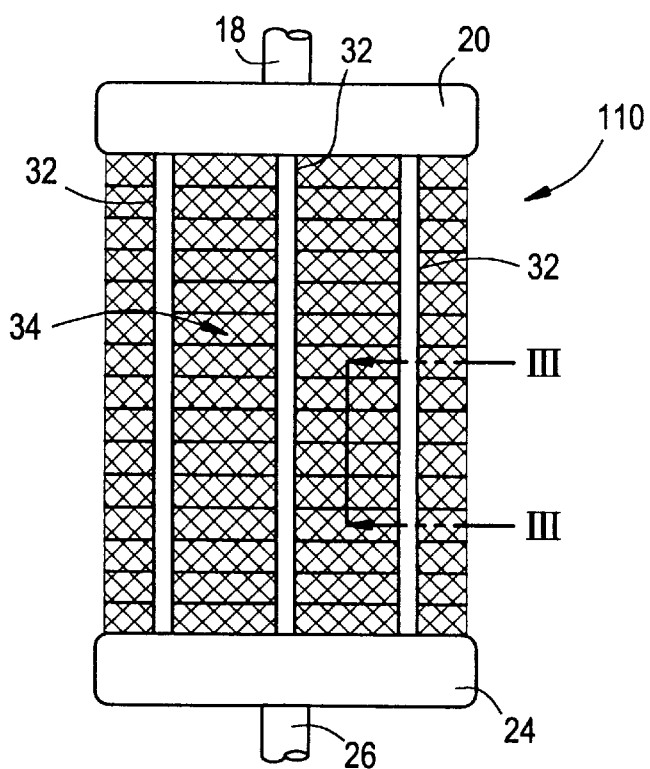
FIG. 2 shows a further embodiment of the cold storage device according to the invention.
Figure 3:
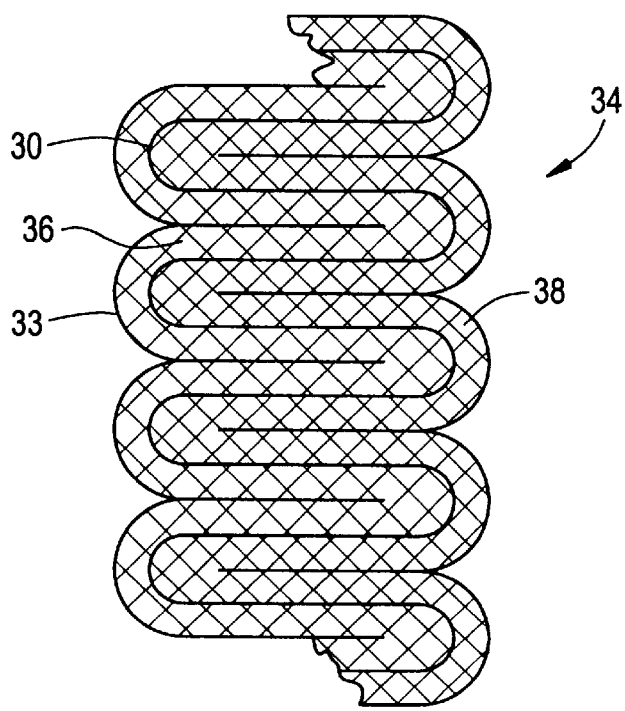
FIG. 3 is a cross sectional view taken along the line III—III in FIG. 2.

In the exemplary embodiment illustrated in FIGS. 2 and 3, the cold storage device 10 is designed as a flat-tube heat exchanger 110. A layered structure 34 is arranged between flat tubes 32, this structure 34 being comprised of three layers, the rib or fin 30 forming the central layer and two layers of non-woven fabric 36 and 38 of the storage medium carrier 14 forming the outer layers. The layered structure 34 is folded in a meandering form and is arranged in each case between two flat tubes 32 in such a manner that the edges of the ribs or fins 30 are in contact with the flat tubes 32. It will be understood that this cold storage device 110, too, preferably has an insulating housing which serves, inter alia, to ensure that no storage medium, i.e., no water, is able to drip, run or evaporate out of the storage medium carrier 14.

The heat transfer medium used to charge the cold storage device 10, 110 may, for example, be brine which has been cooled by an evaporator in the cooling circuit of an air-conditioning system of an automobile. As a result, the storage medium is cooled and frozen. To discharge the cold storage device 10, 110, the brine, which has been heated in a load or consumption device, for example an air/brine heat exchanger, is cooled by the cold storage device medium as a result of the brine circuit being switched appropriately, during which process the storage medium melts.

It is also conceivable that two separate circuits may be used, in which case a coolant circuit is used to charge the storage device and a brine circuit is used to discharge the storage device and separate pipes are provided for each circuit. The brine circuit used for discharge purposes may also be dispensed with if the air to be cooled is passed directly through the pipe means of the storage device.

Other embodiments of the invention will be apparent to those skilled in the art from consideration of the specification and practice of the invention disclosed herein. It is intended that the specification be considered as exemplary only, with the true scope and spirit of the invention being indicated by the following claims.

The priority document, German patent application no. 197 53 601.8, filed Dec. 3, 1997, is hereby incorporated by reference in its entirety.

What is claimed is:

1. A cold storage device, comprising:
 a storage medium for accumulating cold; and
 a storage medium carrier connected in a thermally conductive manner to at least one pipe, said at least one pipe being adapted to carry a heat transfer medium for charging or discharging the cold storage device;

wherein said storage medium carrier comprises an absorbent material, and wherein said storage medium, in its liquid state, is essentially completely absorbed by the storage medium carrier.

2. A cold storage device as claimed in claim 1, wherein said storage medium, when absorbed, comprises from about 30% by volume to 90% by volume of the storage medium carrier.

3. A cold storage device as claimed in claim 1, wherein said storage medium comprises water.

4. A cold storage device as claimed in claim 1, wherein said storage medium carrier comprises a woven fabric.

5. A cold storage device as claimed in claim 1, wherein said storage medium carrier comprises a knitted fabric.

6. A cold storage device as claimed in claim 1, wherein said storage medium carrier comprises a non-woven fabric.

7. A cold storage device as claimed in claim 1, wherein said storage medium carrier comprises a fiber material that is hydrophilic.

8. A cold storage device as claimed in claim 1, wherein said storage medium carrier comprises a hydrogel.

9. A cold storage device as claimed in claim 1, wherein said storage medium carrier comprises a colloid.

10. A cold storage device as claimed in claim 1, wherein said storage medium carrier comprises a superabsorbent polymer.

11. A cold storage device as claimed in claim 1, wherein said storage medium carrier is a pourable substance.

12. A cold storage device as claimed in claim 11, wherein said storage medium carrier is a powder.

13. A cold storage device as claimed in claim 1, further comprising at least one fin provided between said storage medium carrier and said at least one pipe, wherein said at least one fin comprises a thermally conductive material.

14. A cold storage device as claimed in claim 13, wherein said at least one fin comprises aluminum.

15. A cold storage device as claimed in claim 13, wherein said at least one fin and said storage medium carrier form a layered structure.

16. A cold storage device, comprising:
   a plurality of pipes adapted to carry a heat transfer medium;
   a plurality of fins connected to said pipes in a heat conductive manner;
   a storage medium carrier arranged between said plurality of fins, wherein said storage medium carrier comprises an absorbent material; and
   a storage medium substantially completely absorbed in said storage medium carrier.

17. A cold storage device, comprising:
   a plurality of flat tubes;
   a layered structure arranged between two of said flat tubes, said layered structure comprising a fin as a central layer and a layer of a storage medium carrier on each side of said fin;
   wherein each edge of said fin of said layered structure is contacting one of said flat tubes.

18. A cold storage device as claimed in claim 17, wherein said layered structure is folded in a meandering form.

19. An air conditioning system of an automobile having a cold storage device as claimed in claim 1.

20. An automobile, comprising:
   an air conditioning system; and
   a cold storage device as claimed in claim 1, connected to said air conditioning system.

* * * * *